United States Patent
Bean et al.

(10) Patent No.: US 6,796,507 B2
(45) Date of Patent: Sep. 28, 2004

(54) APPARATUS AND METHOD FOR DETERMINING INGREDIENTS BY LABEL SCANNING

(75) Inventors: Heather Noel Bean, Ft. Collins, CO (US); Mark Nelson Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/259,029

(22) Filed: Sep. 27, 2002

(65) Prior Publication Data

US 2004/0060986 A1 Apr. 1, 2004

(51) Int. Cl.$^7$ ................................................ G06K 7/10
(52) U.S. Cl. ............................ 235/462.14; 235/462.25
(58) Field of Search .............................. 235/375, 380, 235/383, 492, 462.13, 462.45, 462.44, 472.01, 462.14, 462.15, 462.25, 462.27

(56) References Cited

U.S. PATENT DOCUMENTS

| | | | |
|---|---|---|---|
| 4,402,088 A | 8/1983 | McWaters et al. | 382/68 |
| 4,521,677 A * | 6/1985 | Sarwin | 235/385 |
| 4,538,072 A | 8/1985 | Immler et al. | 250/568 |
| 4,780,599 A * | 10/1988 | Baus | 235/383 |
| 5,478,989 A | 12/1995 | Shepley | 235/375 |
| 5,752,582 A * | 5/1998 | Hayward | 186/61 |
| 6,375,077 B1 | 4/2002 | Hankins | 235/462.45 |

* cited by examiner

Primary Examiner—Daniel St.Cyr

(57) ABSTRACT

The present invention provides a system and method for determining ingredients based upon scanning a label on a food container. Briefly described, one embodiment is a method comprising scanning a textual ingredients list on a label of the product, converting the scanned textual ingredients list into ingredients data using an optical character resolution program, comparing the ingredients data to preference data, the preference data corresponding to at least one preference for at least one consumer and generating a notification to a user when at least one ingredient in the ingredients data corresponds to at least one preference the consumer.

21 Claims, 6 Drawing Sheets

APPARATUS AND METHOD FOR DETERMINING INGREDIENTS BY LABEL SCANNING

TECHNICAL FIELD

The present invention is generally related to scanning, more particularly, is related to a system and method for determining ingredients based upon scanning a label on a container.

BACKGROUND

Scanning devices are configured to scan bar codes on a container label such that information corresponding to the product that the label is attached to is determinable. The determined information may be determined from the scanned bar code by cross-referencing the product, identified by the scanned bar code, with information residing in a database, look-up table or the like.

When such devices are portable, the devices includes a scanner and a configurable database, such as disclosed in U.S. Pat. No. 6,375,077 to Hankins. However, the Hankins device is limited to scanning barcodes provided on packaged foods. The Hankins system includes a database which is accessed on the basis of the barcodes. The database includes such information as a description of the ingredients of the food product. The Hankins system may also advise the user of any product containing 'unacceptable' ingredients to the user.

Accordingly, the Hankins database must be separately developed and maintained by the store personnel. That is, bar codes for each product and the ingredients of each product must be put into a database. Furthermore, for each new product in the store, the database must be updated. Since stores may carry different products depending upon the shopping preferences of customers residing in the service area of the store, databases have to be different and separate, or databases have to be unnecessarily large to encompass all possible products sold in the plurality of stores. Also, if the manufacturer alters product contents, the database is incorrect.

Also, if the information is to be useable at home, the relevant portion of data in the database must somehow be communicated to the user at the user's residence. Furthermore, the Hankins' device is not usable at the home, or at another's home when visited by the user, because the database is stored at the store.

SUMMARY

The present invention provides a system and method for determining ingredients based upon scanning a label on a container. Briefly described, one embodiment is a method comprising scanning a textual ingredients list on a label of the product, converting the scanned textual ingredients list into ingredients data using an optical character resolution program, comparing the ingredients data to preference data, the preference data corresponding to at least one preference for a consumer and generating a notification to a user when at least one ingredient in the ingredients data corresponds to at least one preference of the consumer.

BRIEF DESCRIPTION OF THE DRAWINGS

The components in the drawings are not necessarily to scale relative to each other. Like reference numerals designate corresponding parts throughout the several views.

DETAILED DESCRIPTION

The present invention provides a system and method for determining ingredients based upon scanning a label on a food container. More specifically, in one embodiment, ingredients are determined by scanning the container label and "reading" the ingredients using an optical character resolution (OCR) program.

Figure 1:
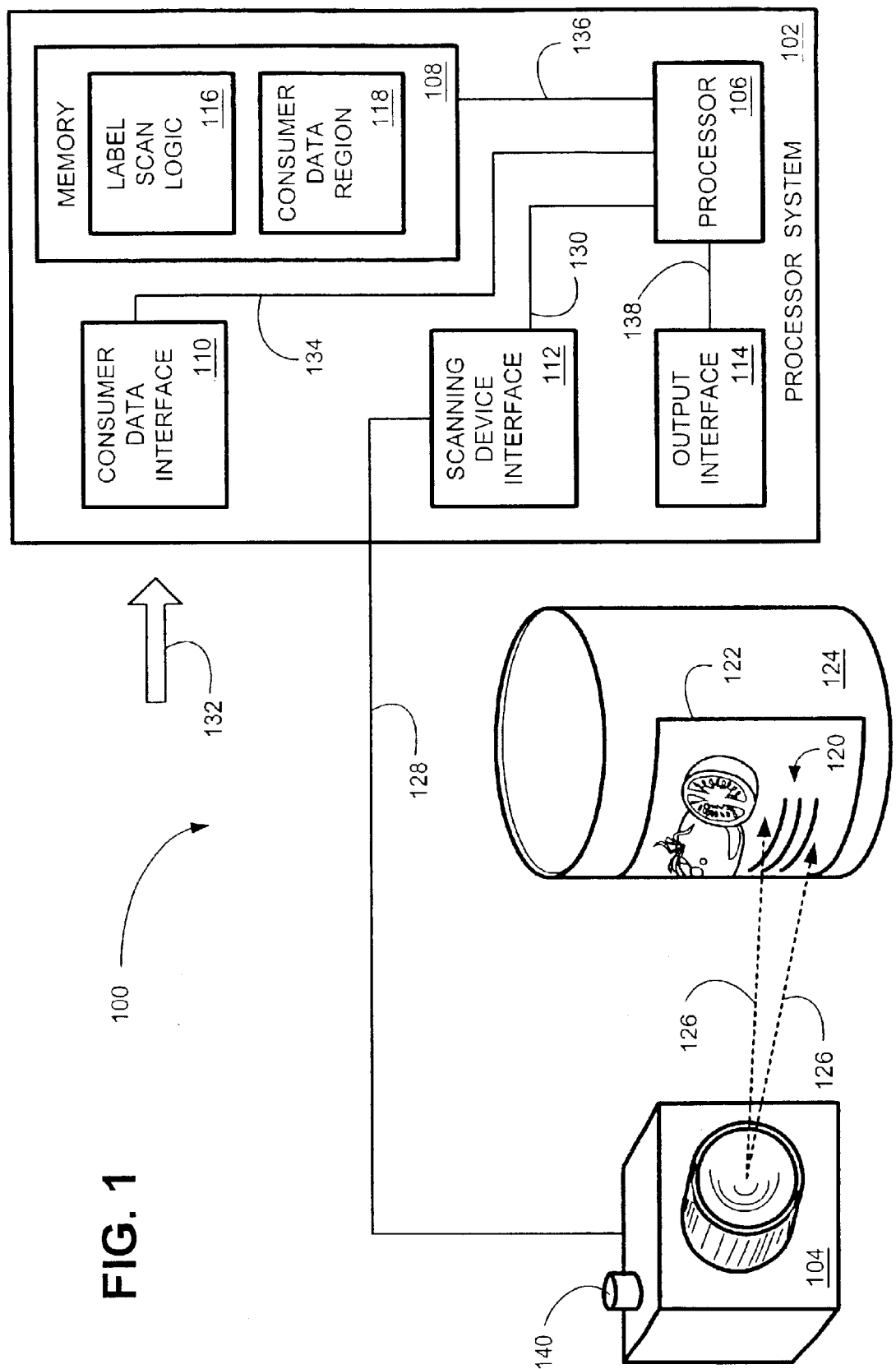
FIG. 1 is a block diagram illustrating an embodiment of the ingredient determination device.

FIG. 1 is a block diagram illustrating an embodiment of the ingredient determination device 100. Ingredient determination device 100 includes a processor system 102 and a scanner 104. Processor system 102 includes a processor 106, memory 108, consumer data interface 110, scanning device interface 112 and output interface 114. Memory 108 includes portions for the label scan logic 116 and the consumer data region 118.

The shopper uses scanner 104 to scan the ingredients list 120 on label 122 affixed to container 124, as generally indicated by arrowhead lines 126. Information corresponding to the scanned label ingredient list 120 is communicated to processor system 102, via connection 128. The information is received by the scanning device interface 112 and communicated to processor 106, via connection 130.

Prior to scanning an ingredients list, in one embodiment, the shopper or another person has input information relating to a plurality of consumers to the processor system, via the consumer data interface 110. This information, generally denoted by arrow 132, is communicated from the consumer data interface 110 to processor 106, via connection 134, and is then stored into the consumer data region 118, via connection 136.

The consumer information residing in the consumer data region 118 includes ingredient preferences of each one of the consumers. Preferences may be based upon personal likes and dislikes regarding an ingredient, and/or other factors such as, but not limited to, allergies or intolerances to ingredients.

As the user of the ingredient determination device 100 scans the ingredient list 120 with scanner 104, the information is processed by the label scan logic 116 to determine the ingredients in the product. Thus, one embodiment of scan label logic 116 includes an optical character resolution (OCR) feature such that the scanned ingredients list 120 is interpreted to determine the ingredients. Another embodiment of the label scan logic 116 is configured to operate in concert with a separate OCR program executed by processor 106.

The ingredient determination device 100 then compares the determined ingredients with the data associated with each consumer to determine if any preferences correspond to determined ingredients. If one of the preferences of a consumer corresponds to a determined ingredient, the user is notified of the correspondence by a suitable communication, via output interface 114. Thus, the label scan logic 116 is executed by processor 106 to determine ingredients from the scanned ingredient list 120, and if one or more preferences match with one or more determined ingredients, a suitable communication is generated and sent to the output interface 114, via connection 138. Embodiments of the output interface 114 are described in greater detail below.

Figure 2:
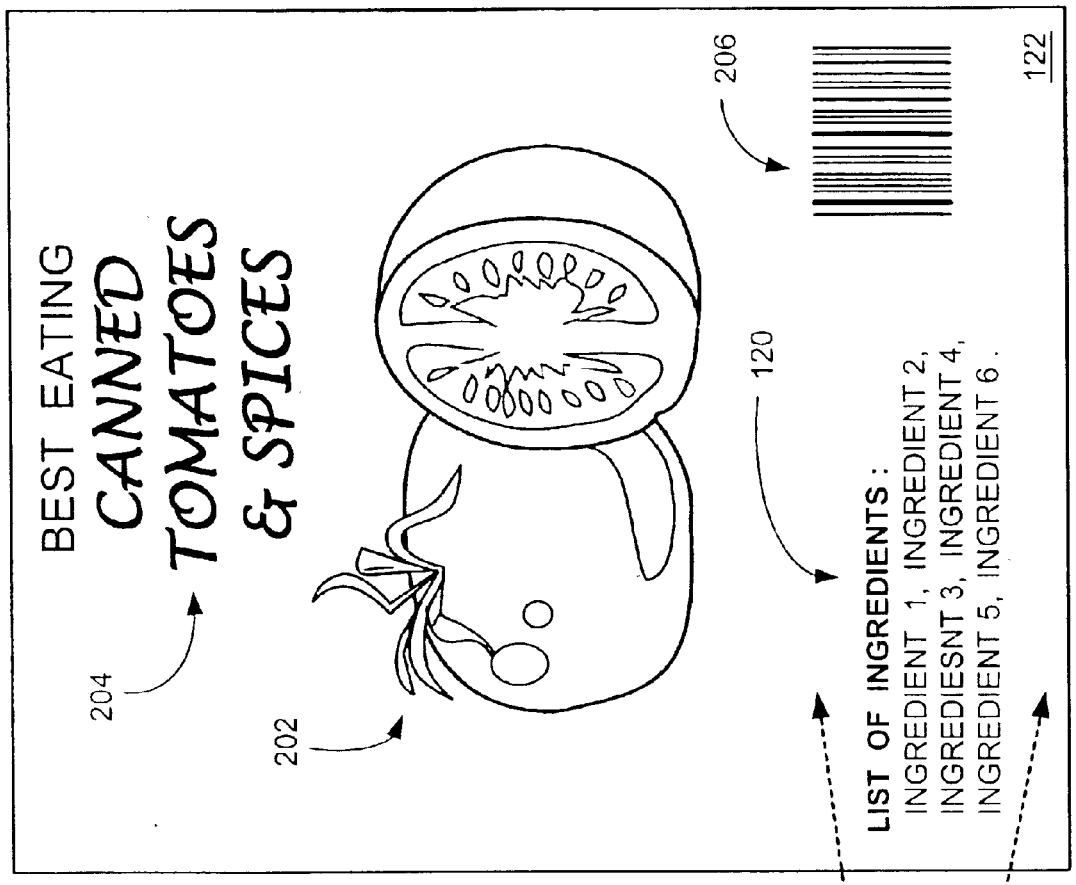
FIG. 2 is a diagram illustrating in greater detail an embodiment of the ingredient determination device scanning a list of ingredients on a label.
Figure 2:
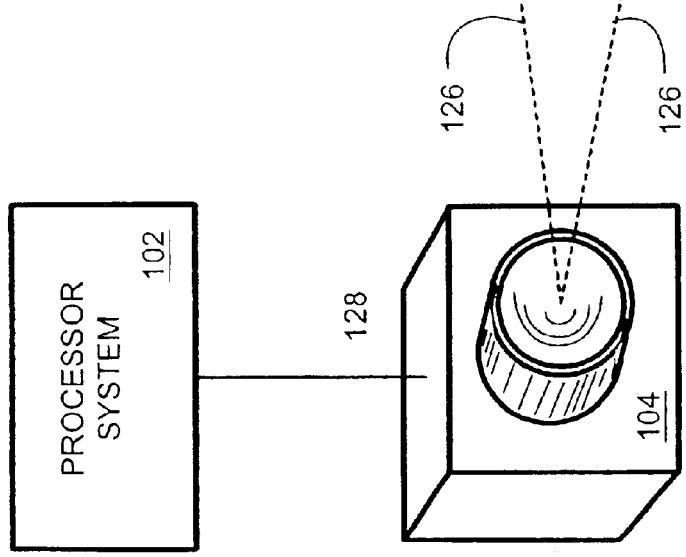

FIG. 2 is a diagram illustrating in greater detail an embodiment of the ingredient determination device scanning an exemplary ingredients list 120 on a label 122 (see also FIG. 1). The ingredients list 120, in this illustrative example, includes six ingredients (ingredients 1–6). For purposes of illustrating the present invention, it is understood from FIGS. 1 and 2 that the label 122 corresponds to a can of tomatoes, as indicated by the product image 202 (tomatoes) and the product name 204 ("Best Eating Canned Tomatoes & Spices"). Accordingly, it is apparent that one of the ingredients will be tomatoes. Other exemplary ingredients include the various spices added into the product. Preservatives, flavor enhancers and/or food coloring may also be other listed ingredients.

If one of the preferences of a consumer corresponds to a determined ingredient, the user is notified of the correspondence. For example, a first consumer may be allergic to tomatoes. Accordingly, the ingredient determination device 100 would notify the user that the first consumer is allergic to tomatoes. Accordingly, the user may decide not to prepare a food item having the canned tomatoes, or may warn the first consumer not to eat the dish having the canned tomatoes.

On the other hand, a second consumer may have a very strong liking for canned tomatoes. Canned tomatoes may be that person's favorite food. Accordingly, the user may wish to tell the second consumer that the prepared dish includes their favorite food, canned tomatoes.

Many benefits of the ingredient determination device 100 are realized. Since no external barcode/ingredients database is required, the barcode/ingredients database does not have to be developed and maintained by the store. The store can change or add products at any time, while the shopper can immediately use the ingredient determination device 100 to determine ingredients of the changed or added products. Also, the manufacturer may change ingredients at any time without having to notify the store to update its barcode/ingredients database.

The user of the ingredient determination device 100 is immediately notified of any instances of consumer preferences which correspond to determined ingredients as the products are selected from the store. Thus, if a dangerous allergy condition in a consumer is indicated by the ingredient determination device 100, an alternative product may be selected.

The user of the ingredient determination device 100 may use the device at home since a barcode/ingredients database is not required. Thus, during meal preparation, the cook can use the ingredient determination device 100 as a food dish is prepared. Since the ingredient determination device 100 notifies the cook at the time of meal preparation of any instances of consumer preferences which correspond to determined ingredients, the cook may alter the food dish ingredients or notify the consumer.

Also, because the consumer data region 118 (FIG. 1) may be updated with new information at any time, changes in preferences for a consumer may be added to the consumer data region 118. For example, a consumer may have only recently discovered an allergy to an ingredient. Or, a new consumer and their preferences may be added to the consumer data region 118. For example, the cook may be preparing a meal for a visitor. The new consumer and their preferences may be added to the consumer data region 118 via a communication before the visitor arrives.

The user may also use the ingredient determination device 100 at remote locations. For example, the user may allow the chef at a restaurant to use the ingredient determination device 100. Or, the user may be a visitor at a friend's home or going to a picnic or the like. Accordingly, the user of the ingredient determination device 100 may scan ingredients prior to consumption of the product. Or, cooks at an institution, such as a hospital of the like, can use the ingredient determination device 100 to identify consumers who should not be given certain food products. These above-described exemplary uses of an ingredient determination device 100 is possible because a barcode/ingredients database is not required.

An alternative embodiment of the ingredient determination device 100 is further configured to "read" a product name portion of the product label. For example, the product name 204 (FIG. 2), "Best Eating Canned Tomatoes & Spices", may be scanned with scanner 104. Thus, the determined product name 204 may be communicated to the user to verify the current determined ingredient list. Furthermore, the product information, determined ingredients, any determined correspondence between preferences and ingredients, and or user messages (described in greater detail below), are saved into memory 108 (FIG. 1) for later reference.

Figure 3:
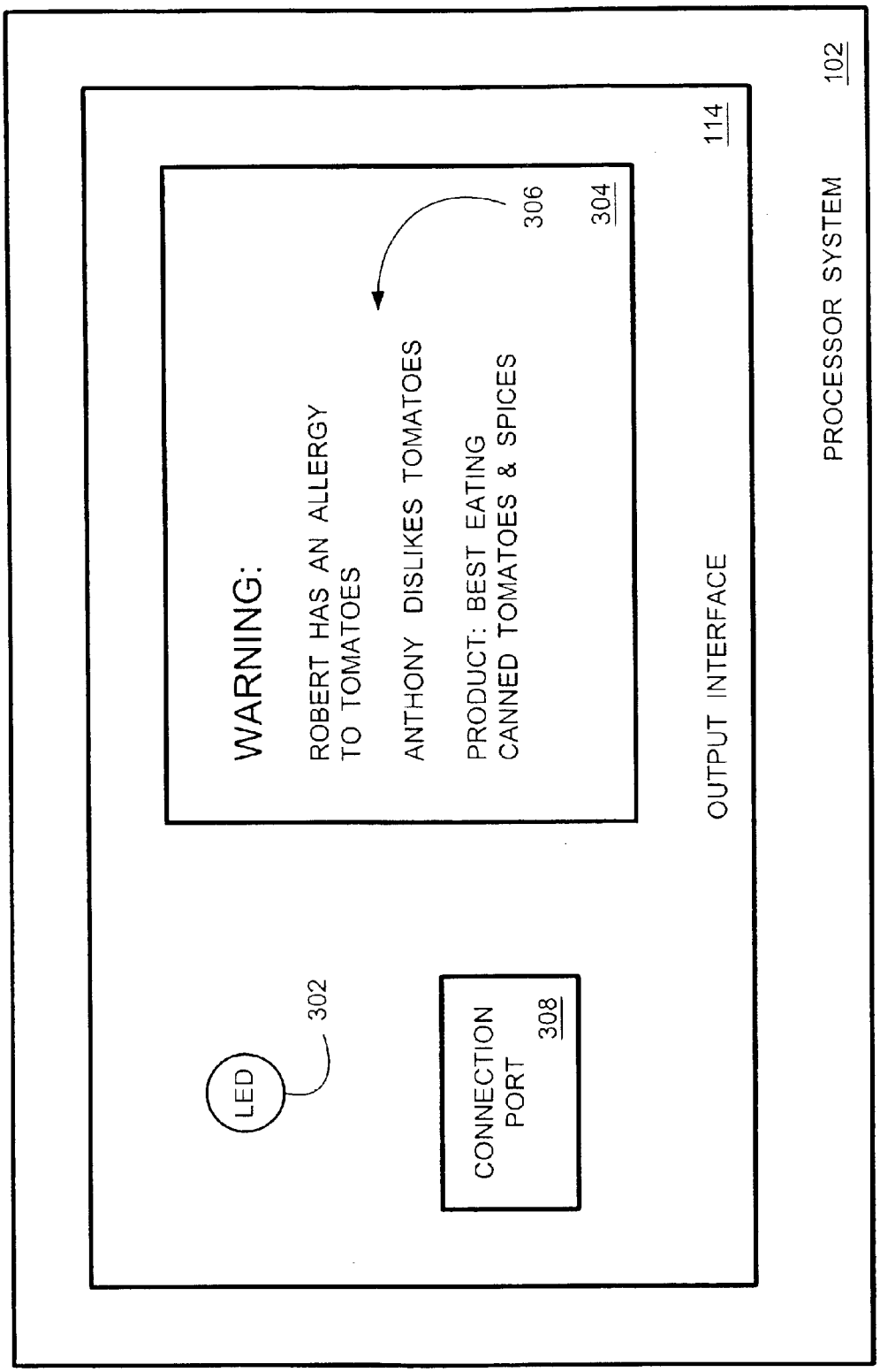
FIG. 3 is a block diagram illustrating in greater detail the output interface of an embodiment of the ingredient determination device.

The embodiment configured to scan a product name includes a suitable controller 140 (FIG. 1). Controller 140 may be any suitable actuator device, such as, but not limited to, a push-button, a toggle-switch, a multi-position sensing device configured to sense a plurality of switch positions, a touch sensitive device or a light sensitive device. Furthermore, the functionality of controller 140 may be alternatively implemented as a menu displayed on display, such as display 304 (FIG. 3). When controller 140 is actuated to a first position, scanned information is known to be product ingredients. When actuated to a second position, scanned information is known to be the product name.

For convenience, controller 140 is located at a convenient location on scanner 104. In other embodiments, controller 140 is located on the surface of processor system 102. In yet another embodiment, label scan logic 116 (FIG. 1) is configured to recognize ingredients from a product name and identify scanned information accordingly.

Another alternative embodiment of the ingredient determination device 100 is further configured to "read" a nutritional information portion of the product label. Nutritional information includes the amount of various nutrients in a serving of a food product, measured as a weight or other suitable indicator, and/or the recommended daily percentage allowance for the listed nutrient. Thus, the nutrient information may be communicated to the user after scanning a textual nutrition list.

In one embodiment, a preference of a consumer is related to the nutrients in a food product. For example, a consumer may desire to limit consumption of a specified nutrient to a maximum weight value or a percentage of recommended daily allowance value. Accordingly, a preference is defined as a maximum weight value or a maximum percentage of recommended daily allowance value. If the scanned nutrients indicate that the amount of a product's nutrient exceeds a specified maximum weight value or a specified percentage of recommended daily allowance value (a consumer preference), a suitable message is communicated to the user. Furthermore, the nutrient information may be saved into memory 108 (FIG. 1) for later reference.

FIG. 3 is a block diagram illustrating in greater detail the output interface 114 of an embodiment of the ingredient determination device 100. An embodiment of an output interface 114 includes one or more of the following components: a warning light emitter, such as a light emitting diode (LED) 302 or other light emitting component, a display 304, and/or a connection port 308.

In an embodiment employing LED 302, when a consumer preference corresponds to a determined ingredient, the user is notified by emission of light from LED 302. Thus, when the user sees light emitted from LED 302, the user understands that at least one consumer preference corresponds to at least one determined ingredient. LED 302 is color coded in one embodiment to indicate the nature of the relationship between the consumer preference and the determined ingredient. For example, a red light is emitted to indicate a dangerous or undesirable condition. Thus, if a determined ingredient is known to cause an allergic reaction in at least one of the consumers, LED 302 emits a red light. Furthermore, flashing the light may indicate levels of severity of the possible danger and/or increase the likelihood that the user will notice the light. In another embodiment, a green light is emitted to indicate that at least one of the ingredients is a favorite ingredient of at least one of the consumers. Any suitable device configured to emit light may be used as a component of an output interface 114.

When a consumer preference corresponds to a determined ingredient, the user is notified by a suitable text message displayed on display 304. Thus, when the user sees a message 306 on the display 304, the message can be read by the user to determine the nature of the consumer preference corresponding to a determined ingredient. An illustrative exemplary message 306 is shown in FIG. 3. Here, the exemplary consumer is Robert. Robert has an allergy to tomatoes. Thus, when the ingredient list 120 on label 122 (FIGS. 1 and 2) is scanned by the user (who may or may not be Robert), the user understands that Robert, because of his allergy, should not consume the tomatoes or any food dish prepared with the tomatoes. Furthermore, in an embodiment that is configured to scan the product name, the product name is displayed. Thus, in the example above, the message identifies the product as "Best Eating Canned Tomatoes & Spices."

Any suitable text may be used in message 306. Furthermore, message 306 may be expanded to include information indicating a correspondence of multiple preferences with multiple ingredients for a single consumer, or may include information for multiple consumers. For example, the illustrative message 306 indicates that Anthony dislikes tomatoes.

Furthermore, the messages may be saved into memory 108 (FIG. 1) by one embodiment of an ingredient determination device 100 for later reference. In one embodiment, all of the message 306, or a portion of the message, is colored to indicate levels of severity of the possible danger. In another embodiment, all or portions of the message 306 may flash to increase the likelihood that the user will notice the message 306.

A connection port 308 is employed by one embodiment so that information corresponding to instances when a consumer preference corresponds to a determined ingredient is communicated to another device. For example, information corresponding to message 306 may be communicated to a personal computer (PC) so that a database is generated. Or, the connection port 308 may be configured to couple with and communicate to a remote display device. Or, the information may be communicated to another device via a communication medium, such as by a wireless signal, infrared signal, optical signal or the like. Or, the information may be communicated over the Internet to a remote site in the form of an e-mail message or the like.

As illustrated in FIG. 1, scanner 104 communicates information corresponding to the scanned label ingredient list 120 to processor system 102 via connection 128. For convenience, connection 128 is illustrated as a hardwire connection. Connection 128 may be implemented with other suitable media, such as infrared, optical, wireless or the like without departing from the present invention.

Furthermore, connections 130, 134, 136 and 138 were illustrated for convenience as hard wire connections to processor 112. In other embodiments, one or more of these connections 130, 134, 136 and/or 138 may be replaced with other suitable media, such as a bus or the like, and/or may be coupled via one or more other intermediary components (not shown) without departing from the present invention.

The processor 102 is typically a commercially available processor. Examples of commercially available processors include, but are not limited to, a Pentium microprocessor from Intel Corporation, Power PC microprocessor, SPARC processor, PA-RISC processor or 68000 series microprocessor. Many other suitable processors are also available. Or, processor 102 may be a specially designed and fabricated processor in accordance with the present invention.

For convenience, the container 124 (FIG. 1) was illustrated as a can. Container 124 may be any suitable container or package that holds at least one product having at least one ingredient.

Also, for convenience, the product described above and illustrated in FIGS. 1–3 were tomatoes. It is understood that the present invention is not limited to consumable food products. The product may be any product that has at least one ingredient. For example, the product may be a medicine. Furthermore, the ingredients need not be the type of ingredient eaten by the consumer. Ingredients may enter the consumer's body by other manners. For example, ingredients in hair and/or skin care products may be absorbed through the skin. Eye drops or contact eye solutions/cleansers may enter through the eye. Soaps and other cleaners may have ingredients that are absorbed through the skin. Clothes may contain fabrics (an ingredient) that a consumer may have an allergic reaction to. Such products have labels with an ingredients list. The present invention is configured to correlate any type of consumer "preference" with ingredients read from any type of product label having a textual listing of ingredients.

Another embodiment is configured to operate in conjunction with devices that are configured to scan a bar code 206 (FIG. 2) and configured to determine information from the scanned bar code 206. Thus, if a remote database is available that has supplemental information corresponding to bar codes, such an embodiment of the present invention accesses supplemental information determined by a bar code based system.

Figure 4A:
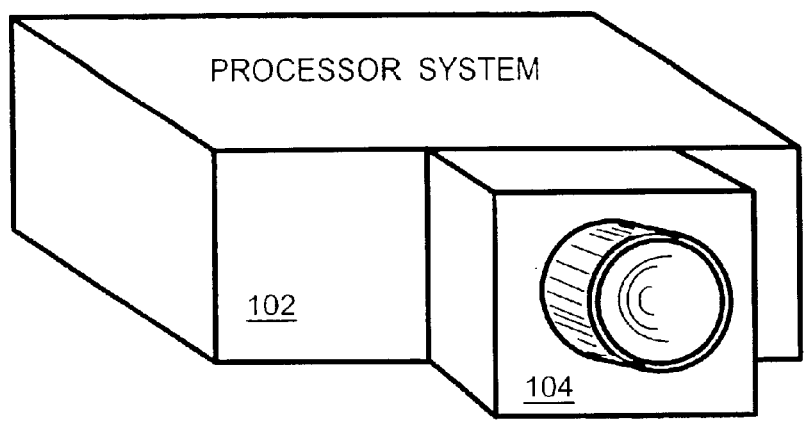
FIG. 4A is a block diagram illustrating an embodiment where the scanner and the processor system are combined into a single, portable hand-held unit.

FIG. 4A is a block diagram illustrating an embodiment where the scanner 104 and the processor system 102 are combined into a single, portable hand-held unit. This embodiment provides a high degree of freedom to the user, and is easily transported to remote locations (such as a picnic or a host's home).

Figure 4B:
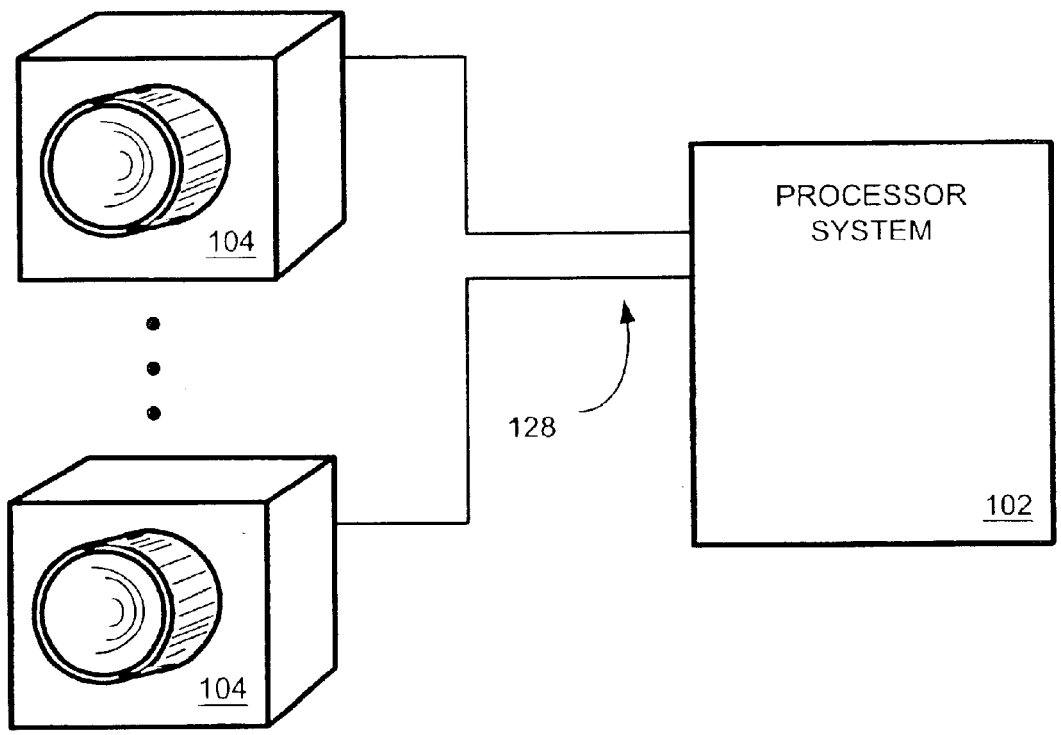
FIG. 4B is a block diagram illustrating an embodiment where a plurality of scanners couple to the processor system.

FIG. 4B is a block diagram illustrating an embodiment where a plurality of scanners 104 couple to the processor system 102. This embodiment may be particularly desirable in an institution, such as a hospital, prison or restaurant, where multiple users are preparing food for large numbers of consumers.

Figure 5:
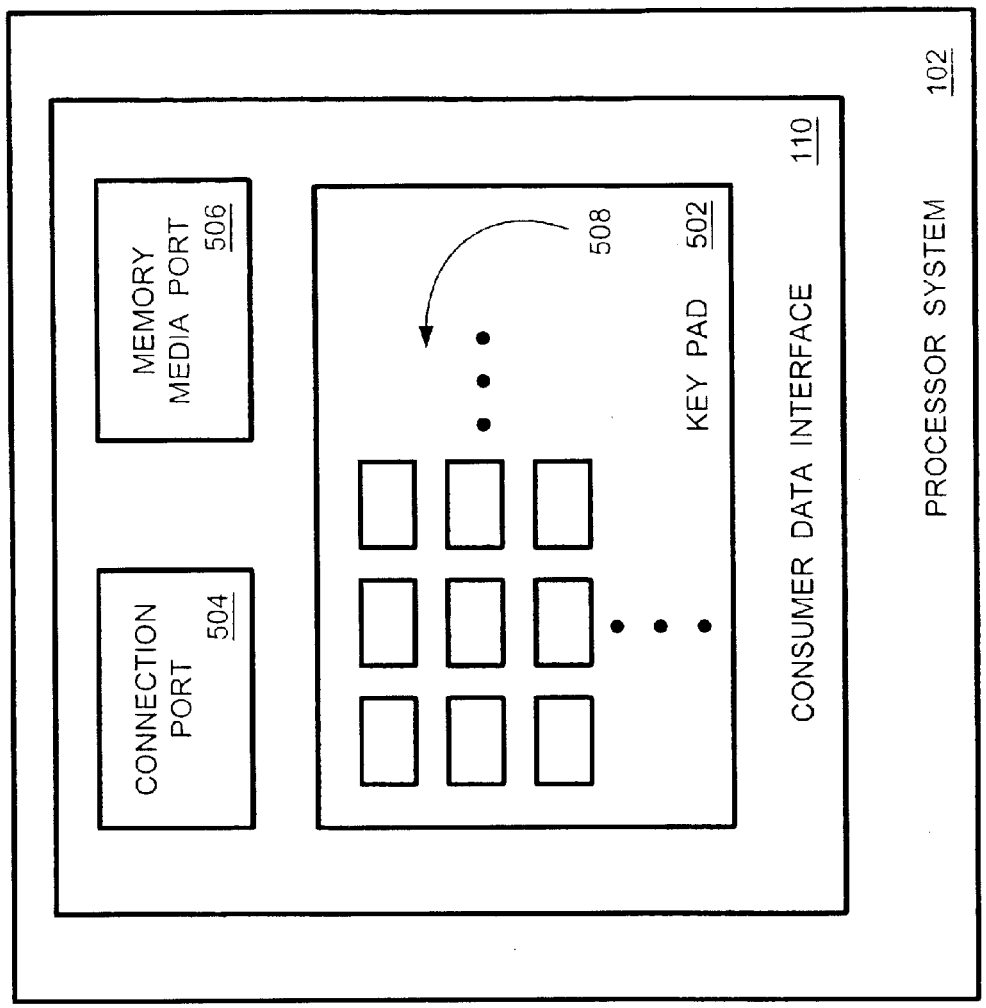
FIG. 5 is a block diagram illustrating in greater detail the consumer data interface of an embodiment of the ingredient determination device.
Figure 5:
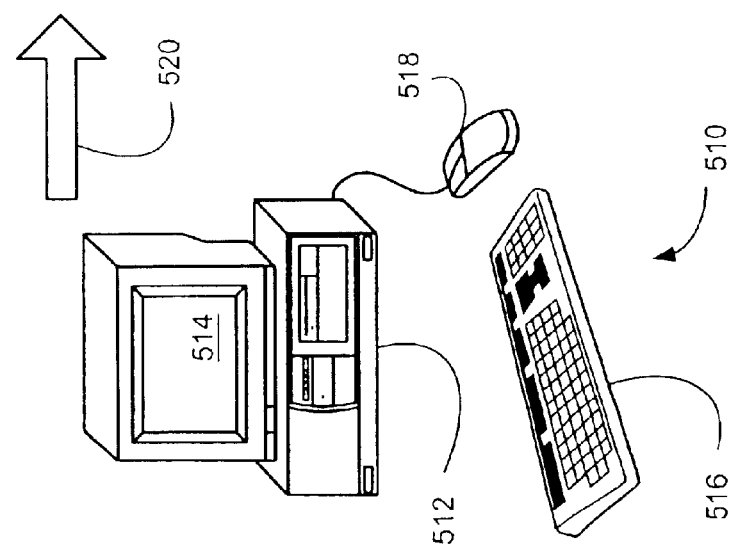

FIG. 5 is a block diagram illustrating in greater detail the consumer data interface 110 of an embodiment of the ingredient determination device 100 (FIG. 1). An embodiment of a consumer data interface 110 includes one or more of the following components: a key pad 502, a connection port 504, and/or a memory media port 506.

Key pad 502 includes a plurality of buttons 508 configured to generate signals corresponding to alpha-numeric text. Accordingly, the user inputs the identity of a consumer, such as a name, serial number or the like, by actuating selected ones of the buttons 508. Similarly, the user inputs the preferences associated with the consumer, by actuating selected ones of the buttons 508. Furthermore, the nature of the preference may be input by the user. For example, the user may use the buttons 508 to enter "robert" (indicating the consumer is Robert), tomatoes (to indicate Robert's preference corresponding to tomatoes) and "allergy" (to indicate that Robert is allergic to tomatoes).

Accordingly, each one of the buttons 508 includes one or more alpha-numeric character labels indicating the alpha-numeric character that will be selected when that button is selected. Any suitable number of and organization of the buttons 508 may be implemented on key pad 502 in accordance with the present invention. Also, buttons may have multiple functions when used in conjunction with a function selection key.

Connection port 504 is configured to couple an external device configured to communicate information that corresponds to a consumer, their preference(s) and/or the nature of the preference. By way of illustration, a personal computer (PC) system 510 is illustrated. PC system 510 includes a processor 512, a display 514, a key board 516 and a mouse device 518. The PC system 510 is understood to couple to connection port 504 via a hardwire connection (not shown), or is understood to communicate via connection port using a suitable media, such as a wireless media, infrared media, optical media or the like. The coupling of the systems and/or components described below to connection port 504 is generally indicated by arrow 520.

In one embodiment, a database of consumer identities, preferences and/or preference nature is maintained on the PC system 514 and communicated to the processor system by the user. In an alternative embodiment the keyboard 516, or a similar device, is coupled directly to connection port 504 such that the user types in the consumer identities, preferences and/or preference nature. In another embodiment, mouse device 518 is coupled to connection port 504 such that a menu based system, displayed on display 304 (FIG. 3), is used to input consumer identities, preferences and/or preference nature. Or, the consumer identities, preferences and/or preference nature may be communicated via an intermediary system, such as via the Internet or by an e-mail message or the like. In other embodiments, connection port 504 is configured to provide coupling to other types of devices, such as a personal device assistant (PDA) or the like.

Memory media port 506 is configured to couple an external memory unit (not shown). The memory unit is configured to store and communicate information that corresponds to a consumer, their preference(s) and/or the nature of the preference. Non-limiting examples of memory media include a floppy disc, a memory stick, a flash memory module, or the like. The information stored in the external memory unit is input by another device (not shown). Thus, a visitor or guest may deliver a memory unit to the user such that the consumer data 118 is updated with information of interest to the visitor or guest.

Figure 6:
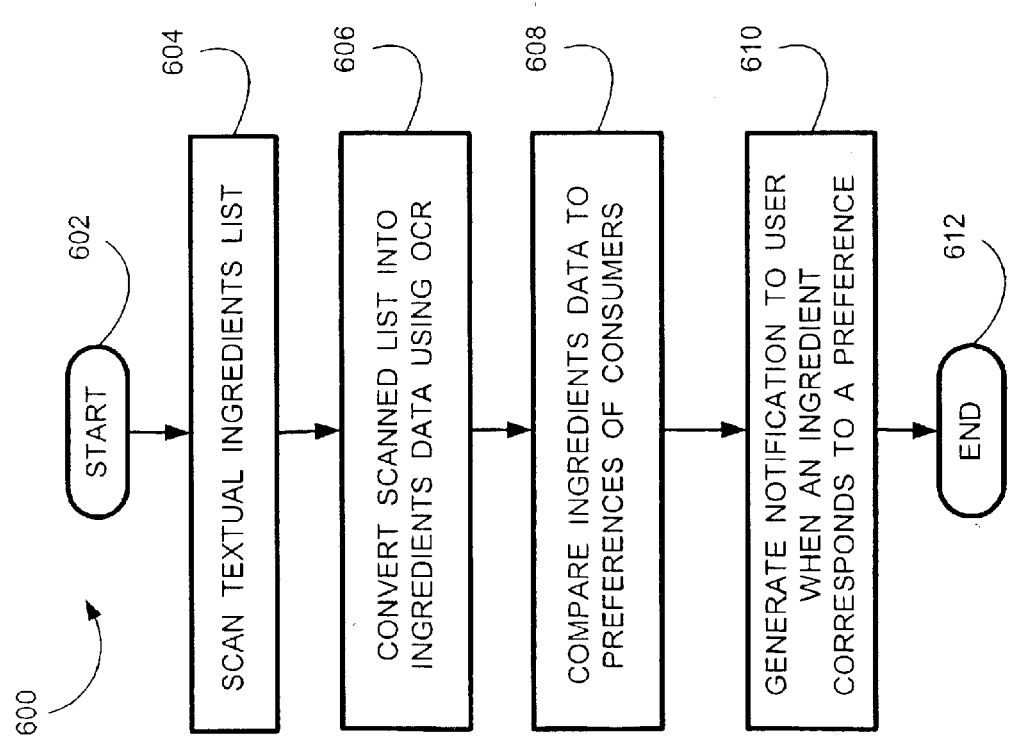
FIG. 6 is a flowchart illustrating an embodiment of a process for scanning and determining ingredients from an ingredient list on a label.

FIG. 6 is a flowchart 600 illustrating an embodiment of a process for scanning and determining ingredients from an ingredients list on a label. The flow chart 600 shows the architecture, functionality, and operation of a possible implementation of the software for implementing the label scan logic 116 (FIG. 1). In this regard, each block may represent a module, segment, or portion of code, which comprises one or more executable instructions for implementing the specified logical function(s). It should also be noted that in some alternative implementations, the functions noted in the blocks may occur out of the order noted in FIG. 6 or may include additional functions without departing significantly from the functionality of the label scan logic 116. For example, two blocks shown in succession in FIG. 6 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure and to be protected by the accompanying claims.

The process starts at block 602. At block 604 a textual ingredients list on a label of the product is scanned. At block 606 the scanned textual ingredients list is converted into ingredients data using an optical character resolution program. At block 608 the ingredients data is compared to preference data corresponding to at least one preference for each one of a plurality of consumers. At block 610 a notification to a user is generated when at least one ingredient in the ingredients data corresponds to at least one preference of at least one consumer. The process ends at block 612.

Figure 7:
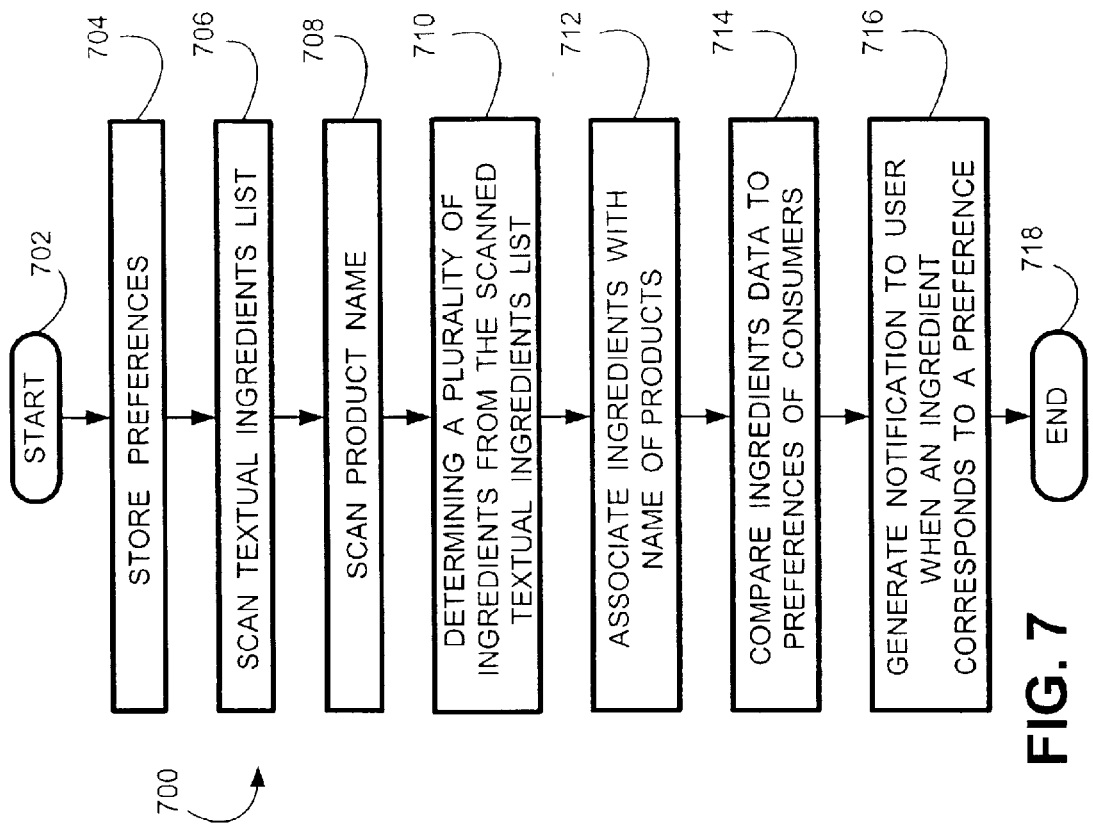
FIG. 7 is a flowchart illustrating another embodiment of a process for scanning and determining ingredients from an ingredient list on a label.

FIG. 7 is a flowchart 700 illustrating another embodiment of a process for scanning and determining ingredients from an ingredients list on a label. The flow chart 700 shows the architecture, functionality, and operation of a possible implementation of the software for implementing the label scan logic 116 (FIG. 1). In this regard, each block may represent a module, segment, or portion of code, which comprises one or more executable instructions for implementing the specified logical function(s). It should also be noted that in some alternative implementations, the functions noted in the blocks may occur out of the order noted in FIG. 7 or may include additional functions without departing significantly from the functionality of the label scan logic 116. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure and to be protected by the accompanying claims.

The process starts at block 702. At block 704 at least one preference for each one of a plurality of consumers is stored. At block 706 a textual ingredients list on each one of a plurality of product containers is scanned. At block 708 the product on each one of the plurality of product containers is scanned. At block 710 a plurality of ingredients from the scanned textual ingredients list is determined using an optical character resolution program. At block 712 the plurality of ingredients are associated with the corresponding names of the products. At block 714 the plurality of ingredients are compared to the preferences. At block 716 a notification signal to a user is generated when at least one ingredient corresponds to at least one preference of at least one consumer. The process ends at block 718.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for determining ingredients of a product and comparing with consumer preferences, the method comprising the steps of:
   scanning a textual ingredients list on a label of the product;
   converting the scanned textual ingredients list into ingredients data using an optical character resolution program;
   comparing the ingredients data to preference data, the preference data corresponding to at least one preference for at least one consumer; and
   generating a notification to a user when at least one ingredient in the ingredients data corresponds to at least one preference of the consumer.

2. The method of claim 1, wherein the step of generating a notification further comprises the step of communicating information identifying the at least one ingredient, information identifying the preference, and information identifying the consumer.

3. The method of claim 2, further comprising the step of saving the communicated information identifying the ingredient, the preference, and the consumer into a memory.

4. The method of claim 1, further comprising the steps of:
   scanning a textual product name on the label of the product;
   converting the scanned textual product name into product name data using an optical character resolution program; and
   communicating the product name data to the user.

5. The method of claim 1, further comprising the steps of:
   scanning a product name on the label of the product;
   converting the scanned product name into product identification data using the optical character resolution program; and
   generating a product identification signal that identifies the product when the notification to the user is generated.

6. The method of claim 5, further comprising the step of saving the product identification data into a memory.

7. The method of claim 1, further comprising the step of scanning a bar code to access supplemental information.

8. The method of claim 1, wherein the step of generating a notification further includes the step of communicating a warning message to the user when the preference of the consumer corresponding to the ingredient indicates a health risk to the consumer.

9. The method of claim 1, further comprising the steps of:
   scanning a textual nutrition list on a label of the product;
   converting the scanned nutrition list into nutritional data using an optical character resolution program;
   comparing the nutritional data to preference data, the preference data corresponding to at least one preference for the consumer; and
   generating a notification to a user when at least one nutrient in the nutritional data corresponds to at least one preference of the consumer.

10. A method for comparing product ingredients with preferences of at least one consumer, the method comprising the steps of:
    storing for the consumer at least one preference;
    scanning a textual ingredients list on each one of a plurality of product containers, each product container having a product;
    scanning a name of the product on each one of the plurality of product containers;
    determining a plurality of ingredients from the scanned textual ingredients list using an optical character resolution program;
    associating the plurality of ingredients with the corresponding names of the products;
    comparing the plurality of ingredients to the preferences; and
    generating a notification signal to a user when at least one ingredient corresponds to at least one preference of the consumer.

11. The method of claim 10, wherein the step of generating a notification signal further includes the step of communicating information identifying the ingredient, information identifying the preference, and information identifying the consumer.

12. The method of claim 11, further comprising the step of saving the communicated information identifying the ingredient, the preference, and the consumer into a memory.

13. The method of claim 11, further comprising the step of communicating the product name associated with the communicated ingredient to the user.

14. A system which compares product ingredients with preferences of at least one consumer, comprising:
    a scanner configured to scan an ingredients list and a product name residing on a product container;
    a memory configured to store for the consumer at least one preference;
    a processor configured to determine at least one ingredient from the scanned ingredients list, configured to compare the determined ingredients with the preferences, and further configured to generate a message when at least one ingredient corresponds to at least one preference, the message having at least the ingredient, the preference, the product name and an identity of the associated consumer; and a display configured to display the generated message.

15. The system of claim 14, further comprising a controller configured to indicate when the product name is scanned and when the ingredients is list scanned.

16. The system of claim 14, further comprising an interface configured to receive information corresponding to the consumer at least one preference.

17. The system of claim 14, further comprising a light source that generates light when the message is generated.

18. The system of claim 14, further comprising an output interface configured to communicate the generated message to another device.

19. A system for comparing product ingredients with preferences of at least one consumer, comprising:

means for scanning a textual ingredients list and a name of the product, the textual ingredients list and the name residing on a product label;

means for converting the scanned textual ingredients list into a list of ingredients and for converting the scanned name of the product into a product name, the means for converting using an optical character resolution program;

means for comparing the ingredients data to preference data, the preference data corresponding to at least one preference for each the consumer; and means for generating a notification to a user when at least one ingredient in the ingredients list corresponds to at least one preference of the consumer.

20. The system of claim 19, further comprising a means for displaying the notification to the user, the notification including at least the ingredient, the preference, the product name and an identity of the associated consumer.

21. A computer readable medium having a program for comparing product ingredients with preferences of at least one consumer, the program comprising logic configured to perform the steps of:

receiving information corresponding to a scanned textual ingredients list and a scanned name of a product, the textual ingredients list and the name residing on a product label;

converting the scanned textual ingredients list into a list of ingredients and for converting the scanned name of the product into a product name using an optical character resolution program;

means for comparing the ingredients data to preference data, the preference data corresponding to at least one preference for the consumer; and means for generating a notification to a user when at least one ingredient in the ingredients list corresponds to at least one preference of the consumer.

* * * * *